May 30, 1933.  W. T. JONES  1,911,230
THERMOSTATIC VALVE
Filed May 17, 1932  2 Sheets-Sheet 1

Inventor
William T. Jones
by Roberts, Cushman & Woodberry
Attys

May 30, 1933.  W. T. JONES  1,911,230
THERMOSTATIC VALVE
Filed May 17, 1932    2 Sheets-Sheet 2
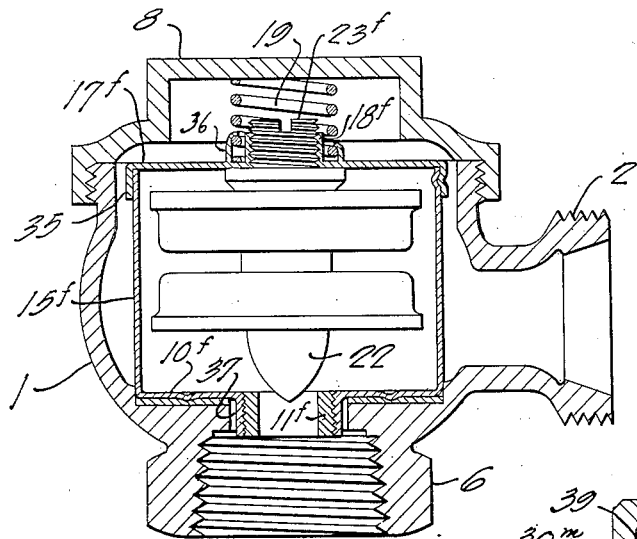
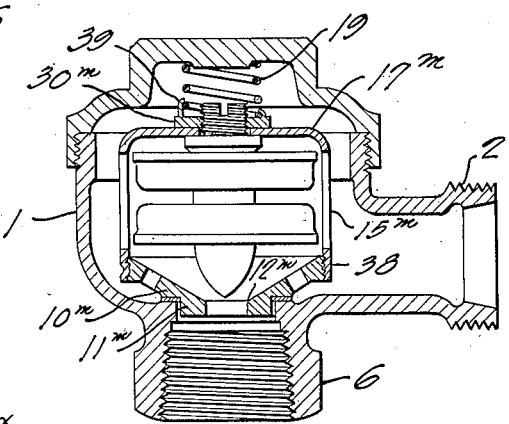
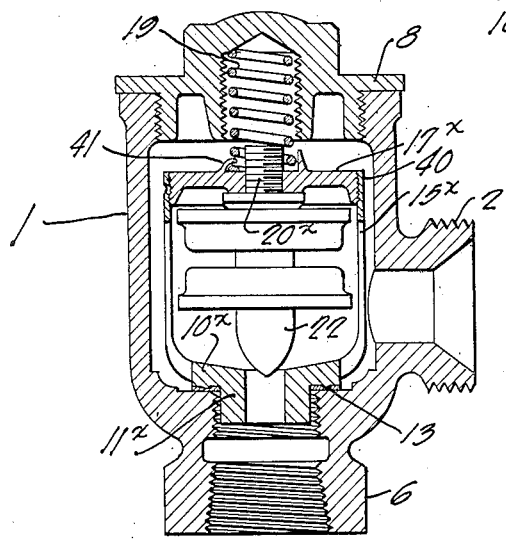
Inventor
William T. Jones
by Roberts, Cushman & Woodbury
Att'ys Patented May 30, 1933

1,911,230

UNITED STATES PATENT OFFICE

WILLIAM T. JONES, OF WABAN, MASSACHUSETTS, ASSIGNOR TO BARNES & JONES, INCORPORATED, OF JAMAICA PLAIN, MASSACHUSETTS, A CORPORATION OF MASSACHUSETTS

THERMOSTATIC VALVE

Application filed May 17, 1932. Serial No. 611,845.

This invention relates to valves and pertains more particularly to improvements in the construction of thermostatic valves adapted automatically to regulate the flow of fluids subject to temperature and/or pressure variations, for example, outlet valves for steam radiators.

Automatic valves of this type comprise a valve actuator responsive to pressure and/or temperature variations, for instance, an actuator consisting of one or more expansible metallic cells, bellows, or the like. Usually the actuator supports the valve feather and, with the latter, is removably mounted in the valve body or casing. Such valves are customarily intended to respond to a very definite condition of temperature or pressure, and are carefully and accurately adjusted by the manufacturer before shipment.

The assembled valve structure, including the outer body or casing,—the valve seat, etc., is customarily installed as a permanent part of a heating system or the like, but while some of the parts (for example, the body or casing) may last indefinitely,—the actuator, and the valve feather, and seat are subject to deterioration, so that replacement or repair of one or more of these parts at intervals is normally expected. Various expedients have been suggested to permit the actuating element to be removed from the valve causing for repair or replacement, but most such suggestions have failed to provide for that accurate adjustment of the reassembled parts which is essential to the proper operation of valves of this character, and although careful provision may have been made in the original design of the valve to prevent improper adjustment of the valve parts by the user, no provision has heretofore been made, so far as I am aware, to insure the accurate adjustment of the valve parts after repair or when it becomes necessary to substitute a new part for an old part, and the principal object of the present invention is to provide a valve structure in which the actuator, the valve feather and the valve seat may be removed from the valve casing as a unit and replaced by a new unit with full assurance that the valve will continue to function as accurately as when first made and calibrated by the manufacturer.

In previous devices it has been proposed to obtain the desired relative adjustment of the valve parts at the time of manufacture, or after repair or renewal, by careful and accurate micrometric dimensioning of the valve body and its cover, and/or by attempting to make the valve, the valve seat, and the actuator so carefully as to be interchangeable, but such accuracy in machining as is necessary to attain this desired result is prohibitively expensive, and even if it were feasible to prepare the parts with such nicety, the theoretical resultant accuracy of relative arrangement of the assembled parts would in all probability be destroyed by rough or abusive handling during transportation or installation.

In accordance with the present invention I provide an arrangement in which all of the parts of the valve which are commonly subject to rapid wear or deterioration are assembled as a unit and are then accurately calibrated by empirical methods to determine their proper operative relation. The constituent parts of the unit are then permanently fixed in the relative positions determined by such calibration. To facilitate installation of the unit in the valve body or casing, but primarily to make the device as nearly fool-proof as possible and to avoid danger of damage to the accurately calibrated and adjusted unit, the latter is so designed that it may be installed in almost any usual valve casing without modification of the latter and without the direct application of tools to the unit such as might distort it and thereby nullify the calibrating and adjusting operation. To this end the device is so designed that it may be installed simply by dropping it freely into the valve body or casing (the cover of the latter first having been removed), and so that it will be held in proper position in the valve body merely by the replacement of the cover and thus when installed its accuracy of operation will not be affected by changes in the internal dimensions of the casing, due, for example, to temperature or other distorting factors.

In carrying the invention into effect I prefer to provide a composite unit comprising what I term for convenience a "cage" or frame consisting of a substantially rigid hollow structure of such dimensions as to permit it to be housed within the usual valve casing. An annular member defining the valve seat is fixed in the lower end of this cage and the actuator (a metallic bellows or the like) is suspended within the cage from the upper end of the latter. The valve feather is carried at the lower end of the actuator, and the seat valve and actuator are relatively adjusted or calibrated as already described to respond to the expected conditions of use, and after calibration the parts are permanently secured against further adjustment or accidental displacement.

This unit preferably is provided with centering means, for example, a tubular boss arranged to enter the outlet passage of the valve casing or the original valve seat if the latter is not removable. A gasket of suitable packing material is preferably interposed between the lower part of the assembled unit and the inner surface of the casing on which the unit rests so as to prevent leakage of fluid past the unit. Preferably this central boss is smooth externally (not screw threaded) and in installing the unit in the casing it is merely necessary to drop it into position with the centering boss in the outlet passage, and the unit may then be held down against the gasket by a spring or other suitable means interposed between the top of the cage and the valve casing cover, it being noted that variations in the tension of this spring resulting from expansion or contraction of the casing,—differences in the internal configuration or adjustment of the covers of different casings, or other dimensional differences such as commonly interfere with the proper setting of the valve parts, have no effect whatsoever upon the accuracy of calibration of the present device which has no mechanical connection to the casing or cover.

Since the composite unit thus provided is merely dropped into place, it is not subjected to distortion during installation such as might be expected if it were necessary to screw it into place by means of a wrench or the like, and since the unit is not carried by the cover its operation is not dependent upon a proper positioning of the latter nor affected by the use of greater or lesser force in securing the cover in place.

In the accompanying drawings I have illustrated various embodiments of the invention, and in particular variations in the construction of the cage whereby to facilitate initial calibration of the parts by the manufacturer.

In the drawings:

Fig. 7 is a view similar to Fig. 1 but showing a control unit of modified construction;

Fig. 8 is another vertical section showing an outlet valve containing a control unit of further modified form; and Fig. 9 is a vertical section showing an outlet valve comprising a control unit of another type.

Figure 1:
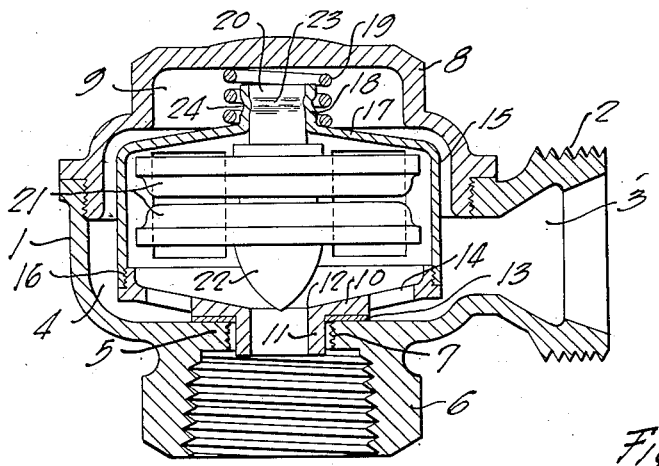
Fig. 1 is a vertical section through an outlet valve embodying the present improvements and illustrating one desirable form of the control unit.

Referring to the drawings, and particularly to Fig. 1, I have illustrated my invention as embodied in an outlet valve such as is commonly employed for automatically controlling the flow of steam through a radiator. This valve as here shown comprises a usual form of casing or body 1 provided at one side with a projecting screw-threaded nipple 2 for attachment to the radiator, such nipple having the inlet passage 3 leading to the chamber 4 in the valve body or casing. This chamber is provided with a bottom wall 5 from which projects the downwardly extending internally screw-threaded socket member 6 adapted to receive the outlet pipe of the radiator,—the bottom wall 5 having an aperture or orifice 7 connecting the chamber 4 with the interior of the socket member 6. This passage or orifice 7 is coaxial with the valve seat, such seat being sometimes formed as a separate sleeve having screw-threaded engagement with the inner wall of the aperture 7, or alternatively being formed integrally with the material of the floor 5 at the upper end of the orifice or passage 7. The valve casing is provided with a removable cover 8 usually having screw-threaded engagement with the casing proper and this cover, as here shown, is provided with a cavity 9 which defines the upper part of the chamber 4.

In accordance with the present invention I provide a removable control unit adapted to be housed in the chamber 4 and which may be dropped freely into and as freely removed from the chamber after the cover 9 has been removed from the body or casing. As shown in Fig. 1, this control unit comprises a frame or cage having a bottom member 10, here shown as a casting, provided with a downwardly projecting tubular boss 11 adapted to enter freely into the aperture or orifice 7 in the bottom wall 5 of the casing, the passage through the boss 11 providing communication between the chamber 4 and the interior of the socket member 6. The outer surface of the boss 11 is preferably smooth (that is, not screw threaded), but in any event its external diameter is such that it may be freely entered into the discharge passage of usual valve bodies without necessitating the use of force or tools, and without requiring any change in the valve body. The upper end of this member 11 is properly shaped at 12 to constitute an annular valve seat. Suitable packing means, for example, a gasket 13 of soft lead is arranged between the bottom member 10 and the floor of the chamber 4, such gasket or packing material encircling the projecting boss 11 and preventing leakage of fluid between the bottom member 10 and the floor 5 of the chamber 4.

The bottom member 10, as shown in Fig. 1, is furnished with openings 14 permitting the free passage of fluid from the chamber 4 into the interior of the cage. In this arrangement, the cage comprises cylindrical side walls 15 integral with a top member 17 which in turn is integral with an upwardly directed tubular boss 18, the parts 15, 17 and 18 being formed from sheet metal or from any other suitable material and in any desired way. As shown in Fig. 1, the side wall 15 of this cage is connected by screw threads at the point 16 to the bottom member 10 and the joint at this point may be soldered if desired. The upwardly projecting boss 18 is encircled by a coiled compression spring 19 which bears at one end against the top 17 of the cage and at the other against the under surface of the cover 8 of the valve body or casing when the latter is in place, the spring being of such stiffness that when the cover is screwed down upon the valve body, the packing material 13 will be compressed sufficiently to prevent leakage below the cage from the chamber 4 into the interior of the socket 6.

The hollow boss 18 receives the supporting stem 20 of the actuator which, as here shown, consists of a pair of expansible-collapsible metallic cells 21 of well-known type adapted to expand or contract longitudinally when subjected to small changes in pressure or temperature. The valve feather 22 is secured to the lower end of the actuator device in concentric relation to the valve seat 12.

As here shown, the stem 20 of the actuator is provided with an annular recess or channel 23, and in the process of manufacture of this control unit, the stem 20 is first slipped into the tubular boss 18 and then the parts are subjected to a predetermined temperature or pressure such as to cause the valve feather 22 to engage the seat 12 and the parts 18 and 20 to move relatively until expansion of the actuator ceases, whereupon the walls of the tubular boss 18 are pressed inwardly into the groove or recess 23, as shown at 24, so as permanently to lock the parts together in this calibrated position. Having thus relatively adjusted the actuator and valve feather with reference to the valve seat 12 and having fixed them in this adjusted position while at a predetermined temperature or pressure, it is clear that whenever thereafter the actuator is subjected to the same pressure or temperature conditions the valve feather will be brought into engagement with the valve seat.

The control unit thus provided may be furnished to users of valves of this type for replacement of control elements which have, through use or otherwise, become inaccurate or inoperative, and this improved unit comprising the actuator, valve feather and valve seat need only be dropped into the valve casing and is then held down against the floor of the valve chamber by means of the spring 19 and the cover 8. If the original valve seat is of the kind which can not be removed, the boss 11 will be inserted in the passage defined by the old valve seat, or if the old valve seat be removable, it may first be removed, if desired, before my improved unit is installed.

Preferably the complete unit will include the gasket 13 which may be placed by the manufacturer upon the boss 11, and also the spring 19 which may, if desired, be attached to the top 17 of the cage or to the boss 18 in any desired manner, for example, as hereinafter described.

Since the unit has no screw-threaded connection or other mechanical means of connecting it either to the valve casing or to the cover, it is unnecessary to employ any tools whatever in installing it or removing it, and thus there is no danger that it will be distorted or injured by a careless or ignorant workman in such a way as to destroy the accurate calibration to which it was subjected by the manufacturer. Moreover, as this unit is not attached to the cover, any failure to set the cover up properly against the casing, or the introduction of a gasket between the cover and casing to prevent leakage, has no effect upon the accuracy of operation of the valve, nor do changes in size of the casing due to temperature variations or distortions of the casing due to the piping connections in any way affect the operation of the valve.

It is thus obvious that this improved control unit overcomes most of the difficulties previously experienced in the operation and maintenance of valves of this general type and that in particular it provides an interchangeable and self-contained structure applicable to valve casings already installed and of various shapes or sizes and which is substantially fool-proof, since even the most inexperienced person can install it without any substantial danger of throwing it out of adjustment or affecting its original accuracy of operation.

Figure 2:
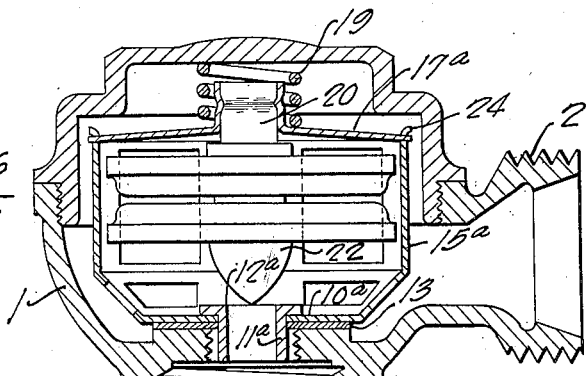
Fig. 2 is a view similar to Fig. 1 illustrating another and preferred form of control unit.

Referring to Fig. 2, I have illustrated a preferred modification of the valve unit, similar parts of the structure in general being denoted by the same numerals as in Fig. 1. In the arrangement shown in Fig. 2 the bottom $10^a$ of the cage is of sheet material and is provided with a tubular sleeve forming a projecting boss $11^a$ to which it may be soldered or secured in any desired manner, the valve seat $12^a$ being at the upper end of sleeve $11^a$. The top $17^a$ of this cage is a separate piece from the side walls $15^a$ and is connected thereto by means of lugs or tongues 24 which project up through openings in the top member $17^a$ and are then bent outwardly as indicated to hold the top and sides of the cage in permanently fixed relative position. The stem 20 of the actuator device may be adjusted and fixed (in calibrating the parts) the same as described with reference to Fig. 1.

Figure 3:
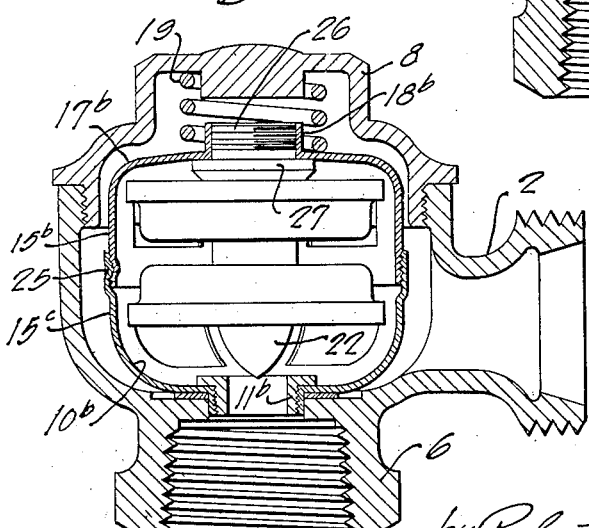
Fig. 3 is a vertical section showing an outlet valve provided with a control unit of further modified construction.
Figure 6:
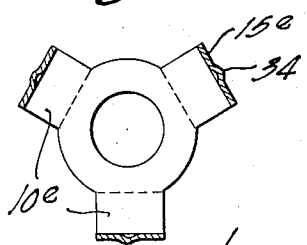
Fig. 6 is a section substantially on the line 6—6 of Fig. 5.

In Fig. 3 a further modified construction of the control unit is shown in which the bottom $10^b$ of the unit is made of sheet metal and is provided with a separate sleeve member $11^b$ and valve seat as in Fig. 2. In this instance the side walls of the cage comprise the upper part $15^b$ and the lower part $15^c$, the latter being integral with the bottom $10^b$ and the former being integral with the top $17^b$. The upper and lower parts of the side walls are arranged to telescope one within the other, preferably having screw-threaded connection with each other at 25, and after proper adjustment under predetermined pressure or temperature conditions the meeting portions of the side walls may be indented or otherwise secured in adjusted position so as permanently to retain the predetermined calibration. In this instance the stem 26 of the actuator is shown as having screw-threaded engagement with the upwardly projecting boss $17^b$, the stem having a radial shoulder 27 acting as a stop to limit relation movement of the parts $18^b$ and 26.

Figure 4:
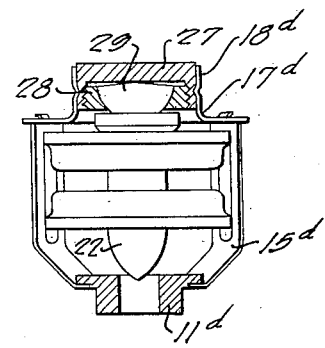
Fig. 4 is vertical section, to smaller scale, illustrating a control unit of a further modified type.

In Fig. 4 the control unit comprises sheet metal side walls $15^d$ and the downwardly projecting sleeve $11^d$ carrying the valve seat, and the top $17^d$ is secured to the side walls in the same way as in Fig. 2. In this arrangement the upwardly directed tubular boss $18^d$ receives an inverted cup member 27 which is internally screw-threaded for the reception of a retaining ring 28 having a spherically curved inner surface for engagement with the spherically curved stem 29 of the actuator device. This spherically curved stem 29 permits slight rocking movement of the actuator relative to the cage to enable the valve feather 22 to seat squarely against the valve seat. In this arrangement the parts are calibrated under proper temperature or pressure conditions by introducing the cup 27 into the boss $18^d$ and then indenting the boss into an annular recess in the cup 27 in the same way as described with reference to the securing of the adjusted parts in Fig. 1.

Figure 5:
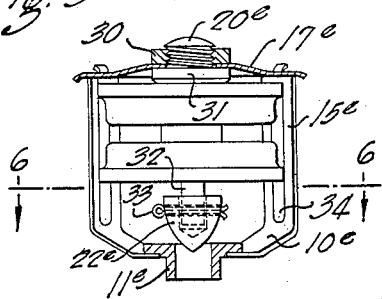
Fig. 5 is a view similar to Fig. 4 but showing a further modification.

In Fig. 5 the control unit comprises the bottom $10^e$ of sheet metal having the sleeve $11^e$ suitably secured thereto,—the bottom being integral with the side walls $15^e$ and having the top $17^e$ connected to the side walls in substantially the same way as shown in Fig. 2. In this case the stem $20^e$ of the actuator is externally screw-threaded for the reception of a screw-threaded collar 30. The inner edge of the top $17^e$ is clamped between this collar 30 and a radial flange 31 of the stem.

The actuator carries a downwardly directed stem 32 on which the valve feather $22^e$ is telescopically mounted. After assemblage of the parts the device is subjected to operating conditions and a hole is drilled through the valve feather $22^e$ and through the stem 22 and a retaining pin 33 is inserted, thus keeping the parts in the predetermined adjusted position.

In Fig. 7 the valve structure is shown as provided with a further modified control unit comprising bottom member $10^f$ of sheet material having a downwardly directed integral sleeve 37 which in this instance has screw-threaded connection with a tubular reinforcing member $11^f$ whose upper end defines the annular valve seat. The side walls $15^f$ are integral with the bottom $10^f$ and are united at 35 with the top member $17^f$ also of sheet metal. At the point of union these parts may be secured by solder, indentation or otherwise, such union being formed while the parts are under calibrating conditions. As shown in this arrangement, the top member $17^f$ is furnished with integral lugs 36 for retaining the spring 19, and the boss $23^f$ is externally screw threaded for engagement with internal screw threads in the boss $18^f$.

In the arrangement shown in Fig. 8 the bottom $10^m$ of the control unit is a casting having the downwardly directed boss $11^m$ with the valve seat $12^m$ at its upper end. The side walls $15^m$ of the cage have screw-threaded engagement at 38 with the peripheral surface of the bottom member $10^m$ and are permanently secured thereto after calibration by solder, indentation or otherwise. The top member $17^m$ of the cage is secured to the stem of the actuator by means of a threaded collar $30^m$ in the same way as shown in Fig. 5, and this collar has upstanding lugs 39 for securing the spring 19 to the control unit.

In Fig. 9 a further arrangement is shown in which the bottom 10ˣ of the cage is a casting having a downwardly directed tubular boss 11ˣ, the side walls 15ˣ being integral with the bottom. In this instance the top 17ˣ is also a casting having screw-threaded engagement at 40 with the side walls and having upstanding lugs 41 for retaining the spring 19 in assembled relation with the unit. The stem 20ˣ of the actuator has screw-threaded engagement with the cover 17ˣ.

While I have herein illustrated various modifications of my improved control unit, it is to be understood that the illustrated embodiments are merely by way of example and that the invention is not limited thereto, but that substitution of parts and materials, rearrangement of the same, and the employment of equivalents may be made without departing from the spirit of the invention.

I claim:

1. An interchangeable control unit for use in valves of the class described, said unit comprising a two-part cage, one part carrying a valve seat and the other carrying a thermostatic actuator and a valve feather supported by the latter, the two parts of the cage being relatively movable for initial adjustment whereby properly to locate the valve feather relatively to the seat, and means permanently uniting said parts of the cage after such adjustment, said unit being so constructed and arranged as to permit it to be dropped freely into operative position in the valve body.

2. An interchangeable control unit for use in valves of the class described, said unit being constructed and arranged to be dropped freely into the valve casing and to be held in operative position therein by resilient means, said unit comprising a cage having two parts telescoping one within the other for initial adjustment, said parts being of sheet metal and having registering indentations holding them permanently in adjusted position one of said parts carrying a valve seat and the other carrying a thermostatic actuator supporting a valve for cooperation with said seat.

3. An interchangeable control unit for use in a valve casing having a chamber for the reception of the unit and an orifice in the wall of the chamber, said unit comprising a substantially rigid cage constructed and arranged to be dropped into operative position in the valve chamber and devoid of mechanical means for securing it to the valve casing, said cage comprising two parts, one of which has screw-threaded engagement with the other for initial relative adjustment of said parts, means permanently preventing relative rotation of said parts after adjustment, one of said parts carrying a valve seat, and a thermostatic actuator carried by the other of said parts, and a valve feather supported by said actuator.

4. An interchangeable control unit for use in a valve casing having a chamber for the reception of the unit and an orifice in the wall of the chamber, said unit comprising a substantially rigid cage, said cage comprising a part carrying a valve seat, means for supporting a valve for movement toward and from said seat, the valve being initially adjustable relatively to the valve seat, and means permanently retaining the valve in adjusted position, said valve supporting means comprising a thermostatic actuator disposed within the cage.

5. An interchangeable control unit for use in a valve casing having a chamber for the reception of the unit and an orifice in the bottom wall of the chamber, said unit comprising a cage having a sheet metal part, a member having telescopic engagement with the sheet metal part thereby to permit initial adjustment of said member relatively to said part, said part having an indentation registering with a depression in said member whereby to retain the part and member permanently in adjusted position, a valve seat fixed relatively to said sheet metal part, a thermostatic actuator carried by said member and supporting a valve feather, means devoid of external screw threads projecting downwardly from the bottom of the cage and adapted to center the valve seat with reference to the orifice in the bottom wall of the valve casing, packing means disposed at the under side of the cage bottom, and a spring mounted on the top of the cage for holding the unit in operative position in the valve casing chamber.

6. An interchangeable control unit for use in a valve casing having a chamber for the reception of the unit and an orifice in the wall of the chamber, said unit comprising a cage having at one end a valve seat and at the other end a tubular boss, a thermostatic actuator having a stem telescoping within the boss for initial adjustment, the stem having a recess therein and the boss having a projection seated in said recess thereby permanently to retain the parts in adjusted position, and a valve feather supported by the thermostatic actuator and adapted to cooperate with the valve seat.

7. An interchangeable control unit for use in a valve casing having a chamber for the reception of the unit and an orifice in the wall of the chamber, said unit comprising a cage having a top and a bottom, and means rigidly holding them in spaced relation, said cage having parts telescoping one within the other for initial adjustment but fixedly united to retain such adjustment, one of said parts being provided with a fixed valve seat and the other of said parts supporting an actuator, and a valve feather carried by the actuator, said parts being so relatively adjusted before they are fixedly united as to locate the actuator and its valve feather with reference to the valve seat whereby to cause the valve to open or close accurately, respectively, under predetermined conditions, the cage being adapted to be dropped freely into the chamber of the valve casing and having devices for centering it and removably holding it in position.

8. An interchangeable control unit for use in a valve casing having a chamber for the reception of the unit and an orifice in the wall of the chamber, said unit comprising a cage having a top and a bottom, and means rigidly holding them in spaced relation, the top at least being of sheet metal and having an upstanding annular boss, a valve seat carried by the bottom member, a stem telescoping within the tubular boss for initial adjustment, said stem having a peripheral groove, the boss having an indentation registering with the groove and retaining the stem and boss in permanently adjusted relation, a thermostatic actuator carried by the stem, and a valve supported by the actuator.

Signed by me at Boston, Massachusetts, this 10th day of May 1932.

WILLIAM T. JONES.